United States Patent Office 3,839,458
Patented Oct. 1, 1974

3,839,458
SEPARATION OF ACETALDEHYDE FROM 3-HY-
DROXYBUTANAL USING A CYCLOALKANE
Roy H. Prinz, Robstown, Tex., assignor to Celanese
Corporation, New York, N.Y.
No Drawing. Filed Jan. 28, 1971, Ser. No. 110,621
Int. Cl. C07c 47/26
U.S. Cl. 260—602     9 Claims

ABSTRACT OF THE DISCLOSURE

A solvent extraction process for separating acetaldehyde from 3-hydroxybutanal using a cycloalkane solvent, such as cyclohexane, the acetaldehyde being preferentially dissolved into the cycloalkane solvent.

BACKGROUND OF THE INVENTION

In producing 3-hydroxybutanal by the alkaline catalyzed condensation of acetaldehyde there results as a product an equilibrium mixture of 3-hydroxybutanal and acetaldehyde together with small amounts of water as well as various reaction by-products. Thus, in order to recover the desired 3-hydroxybutanal product a separation of the acetaldehyde from the 3-hydroxybutanal must be accomplished. In the past several methods have been devised for accomplishing such separation with the most widely used method being distillation. However, due to the thermal sensitivity of 3-hydroxybutanal an efficient separation of acetaldehyde therefrom by distillation generally imposes conditions which result in impurities in the final product due to the reversion of the 3-hydroxybutanal to acetaldehyde and/or to crotonaldehyde. Obviously, such reversion and/or dehydration results not only in impurities in the final product but also causes loss of the 3-hydroxybutanal product. There is a need, therefore, for additional and more efficient means of separating acetaldehyde from 3-hydroxybutanal.

SUMMARY

It is, thus, an object of the present invention to provide a process for separating acetaldehyde from 3-hydroxybutanal. It is a further object of the present invention to provide a process wherein acetaldehyde and 3-hydroxybutanal may be separated with little or no loss of product through thermal decomposition. An additional object of the present invention is to provide a process for recovering 3-hydroxybutanal from the acetaldehyde-3-hydroxybutanal mixtures obtained by the alkaline catalyzed condensation of acetaldehyde. Additional objects will become apparent from the following description of the persent invention.

The present invention which fulfills these and other objects in one of its aspects is a liquid phase solvent extraction process for separating acetaldehyde from 3-hydroxybutanal, said process comprising intimately contacting a mixture comprising acetaldehyde and 3-hydroxybutanal with liquid $C_5$–$C_8$ monomuclear cycloalkane solvent, allowing a raffinate phase rich in 3-hydroxybutanal and an extract phase comprising acetaldehyde dissolved in said cycloalkane solvent to form, followed by separating the resulting extract phase from the resulting raffinate phase, said cycloalkane having a ring of from 5 to 7 carbon atoms.

DETAILED DESCRIPTION OF THE INVENTION

The present invention resides in the discovery that a mononuclear $C_5$–$C_8$ cycloalkane having 5 to 7 members in the ring may be used to extract acetaldehyde from its mixtures with 3-hydroxybutanal, the latter compound also being known by such names as aldol and *beta*-hydroxybutyraldehyde. By "$C_5$–$C_8$ cycloalkane" is meant those having from 5 to 8 carbon atoms although as pointed out above the number of ring carbons is limited to a number from 5 to 7. In other words the cyclopentanes, cyclohexanes and cycloheptanes may be used as the selective solvents in the present invention. Other specific cycloalkanes that are suitable include cyclopentane, cycloheptane, 1,3-dimethylcyclohexane and methylcyclohexane. In using the cycloalkane solvent in the solvent extraction process, the volume used will depend somewhat on the ratio of acetaldehyde to 3-hydroxybutanal in the mixture being treated and will also depend on the degree of separation desired. However, in general at least one volume, for example, one to thirty volumes, of the cycloalkane solvent should be utilized per volume of mixture in order to effect an efficient separation. Preferably at least five volumes are used and optimum results will be obtained when there are used from about twelve to twenty volumes of cycloalkane solvent per volume of mixture being treated.

In accomplishing extraction the main requirement is that the acetaldehyde-3-hydroxybutanal mixture and the cycloalkane solvent be brought together and intimately contacted so as to permit the acetaldehyde to transfer into the cycloalkane solvent and form the extract phase. The 3-hydroxybutanal is relatively unaffected by the contact with the cycloalkane solvent and becomes the raffinate phase. After the extract and raffinate phases have been formed they are separated, separation being easily accomplished by gravity since the extract is lighter than the raffinate. However, the separation may be aided by mechanical means such as the application of centrifugal force if desired.

The extraction equipment used may be operated batchwise or continuously with a continuous process being preferred. Representative types of equipment that may be utilized in both batch operations and continuous operations include mixer-settlers, vertical towers of various kinds which operate by gravity flow, agitated tower extractors and centrifugal extractors. When using a tower extractor operated by gravity flow, such as a vertical tower having packing, baffles or plates therein, the mixture of acetaldehyde and 3-hydroxybutanal will be introduced into a midpoint of the tower while the cycloalkane is introduced at a lower point in the tower. The cycloalkane solvent, being lighter, passes up through the tower while being intimately contacted with the descending mixture. The cycloalkane solvent having preferentially dissolved the acetaldehyde from the mixture leaves the top of the tower as the extract phase while the raffinate phase comprised of an enriched fraction of 3-hydroxybutanal is withdrawn from the bottom of the tower.

Because of the high selectivity of a cycloalkane for acetaldehyde, when the solvent extraction is performed under proper conditions the raffinate phase leaving the bottom of the tower will be a very high purity and can, for example, be sent directly to hydrogenation for the production of 1,3-butylene glycol. Of course, the 3-hydroxybutanal may be further purified by other means if desired. It will generally be desirable to treat the extract phase so as to separate the cycloalkane solvent from the acetaldehyde. This may be accomplished by any of the known means such as by distillation, an acetaldehyde enriched fraction being removed as overheads from a distillation and the cycloalkane solvent enriched fraction as bottoms from the distillation. The cycloalkane solvent may then be recycled to the solvent extraction process.

The solvent extraction may be accomplished over a wide range of temperatures and pressures although it is preferably accomplished within the range of 15° C. to 100° C., especially 40° C. to 70° C. The pressure during the extraction needs only to be sufficient to prevent boiling and maintain a liquid phase and may be subatmospheric, atmospheric or super-atmospheric. Due to the low boiling point of acetaldehyde (21° C.) a super-atmospheric pressure is desirable if operating above 21° C. Specific pressures at which the present invention may be operated include from 0.5 to 10 atmospheres absolute with the preferred operating range being 1 to 3 atmospheres absolute.

The following examples are offered in order to illustrate specific embodiments of the present invention and are not to be taken in a limiting sense.

Example I

A mixture of acetaldehyde and 3-hydroxybutanal was separated by extraction with cyclohexane. The feed mixture was made by condensation of acetaldehyde catalyzed by sodium hydroxide. The mixture contained by weight about 44% acetaldehyde, 1.4% crotonaldehyde, 46% 3-hydroxybutanal, 0.2% sodium acetate and 8% water. The mixture to be separated after being adjusted to a pH of 4.1 by addition of acetic acid was fed to the top of a six foot high, one inch diameter extractor column packed with 3/16" beryl saddles. The mixture was fed at the rate of 3 ml./min. Cyclohexane was fed to the bottom of the extractor at the rate of 50 ml./min. The extractor was operated at 50° C. at a pressure of 1.6 atmospheres absolute. The extract, containing the acetaldehyde was removed from the top of the extractor at the rate of 51.3 ml./min. The raffinate containing the 3-hydroxybutanal and water was removed from the bottom of the extractor. The interphase was maintained at a level 6" from the bottom of the extractor.

The extract was fed to a continuous distillation column (20 trays) and an acetaldehyde fraction was taken overhead at a 20:1 reflux ratio. A cyclohexane enriched fraction was removed as a residue and recycled back to the extractor. Analysis of the various streams showed them to have the following compositions, all percentages being by weight:

Extract

| | Percent |
|---|---|
| Crotonaldehyde | 0.6 |
| Acetaldehyde | 2.6 |
| Cyclohexane | 96.8 |

Raffinate

| | Percent |
|---|---|
| Acetaldehyde | 1.5 |
| Crotonaldehyde | 2.2 |
| 3-Hydroxybutanal | 80.3 |
| Water | 16.0 |

Recycle Cyclohexane

| | Percent |
|---|---|
| Acetaldehyde | 0.0 |
| Crotonaldehyde | 0.6 |
| Cyclohexane | 99.4 |

The foregoing example and most of the foregoing discussions have been limited to a mixture of acetaldehyde and 3-hydroxybutanal as is obtained from a process wherein 3-hydroxybutanal is produced by condensation of acetaldehyde in the presence of an alkaline catalyst. Although treatment of such mixtures which generally contain from about 20 to 55 weight percent acetaldehyde, 20 to 55 weight percent 3-hydroxybutanal and 4 to 15 weight percent water, is where the present invention finds its greatest uses, the invention may also be applied to any mixtures of acetaldehyde and 3-hydroxybutanal. For example, a 3-hydroxybutanal stream which has been previously treated by other means for the removal of acetaldehyde therefrom but which contains 5% or so of acetaldehyde could be advantageously treated in accordance with the present invention to further purify the 3-hydroxybutanal. Thus, the present invention may be used to separate acetaledhyde from 3-hydroxybutanal where the acetaldehyde is present in any appreciable concentration, for example, mixtures comprising from 5 to 65 weight percent acetaldehyde, 35 to 95 weight percent 3-hydroxybutanal, and 0 to 25 weight percent water.

In addition to containing the acetaldehyde and 3-hydroxybutanal, mixtures to be treated in accordance with the present invention may also contain other components which do not interfere with the separation, especially water which may be present in amounts up to 25% by weight of the solution. Components other than water should be present in amounts of less than 5% by weight in order to avoid unduly affecting the separation. Representative of the minor impurities that may be present are crotonaldehyde, sodium acetate, butyraldeyde and acetic acid.

The pH of the mixture to be separated should generally be within the range of 3.5 to 6.0 although the narrow range of 3.9 to 4.3 gives optimum results. If the pH of the mixture of acetaldehyde and 3-hydroxybutanal is not within the desired range it can be easily adjusted by the addition of an acid or base. Usually the pH of an equilibrium mixture obtained from the alkaline catalyzed condensation of acetaldehyde will have a pH of about 5.1 or so and may be adjusted to the preferred range by adding acetic acid.

I claim:

1. A liquid phase solvent extraction process for separating acetaldehyde from 3-hydroxybutanal, said process comprising intimately contacting a mixture comprising acetaldehyde and 3-hydroxybutanal having a pH within the range of 3.5 to 6.0 with liquid $C_5$–$C_8$ mononuclear cycloalkane solvent, allowing a raffinate phase rich in 3-hydroxybutanal and an extract phase comprising acetaldehyde dissolved in said cycloalkane solvent to form, followed by separating the resulting extract phase from the resulting raffinate phase, said cycloalkane having a ring of from 5 to 7 carbon atoms.

2. The process of Claim 1 wherein said mixture comprising acetaldehyde and 3-hydroxybutanal has a pH within the range of 3.9 to 4.3.

3. The process of Claim 1 wherein said cycloalkane is cyclohexane.

4. The process of Claim 1 wherein said extract phase is further treated so as to recover an acetaldehyde enriched fraction therefrom.

5. The process of Claim 1 wherein said mixture has a pH within the range of 3.9 to 4.3 and contains from about 20 to 55 weight percent acetaldehyde, 20 to 55 weight percent 3-hydroxybutanal and 4 to 15 weight percent water, and wherein at least five volumes of said cycloalkane solvent are utilized per volume of said mixture.

6. The process of Claim 5 wherein said cycloalkane is cyclohexane.

7. The process of Claim 6 wherein the intimate contact of said mixture and said cycloalkane solvent is accomplished at temperatures within the range of 40° C. to 70° C. and pressures sufficient to prevent boiling.

8. The process of Claim 7 wherein said mixture is the equilibrium mixture obtained from a process wherein 3-hydroxybutanal is produced by the condensation of acetaldehyde in the presence of an alkaline catalyst, and wherein from about twelve to twenty volumes of cyclohexane are utilized per volume of said mixture.

9. The process of Claim 8 wherein said process is continuous with said extract phase being further treated by distillation so as to recover therefrom both an acetaldehyde enriched fraction and a cyclohexane solvent enriched fraction, the cyclohexane solvent enriched fraction being recycled to be intimately contacted with said mixture.

References Cited
UNITED STATES PATENTS

| | | | |
|---|---|---|---|
| 2,489,608 | 11/1949 | Alheritiere | 260—602 |
| 2,452,797 | 11/1948 | Smith | 260—602 |
| 2,442,280 | 5/1948 | Alheritiere | 260—602 |
| 2,376,070 | 5/1945 | Metzger | 260—602 |
| 1,086,018 | 2/1914 | Hibbert | 260—602 |

OTHER REFERENCES

Vogel, Elementary Practical Organic Chem., 1958, pp. 40–42, and 137–138.

The Condensed Chemical Dictionary, 4th Edit., 1956, pp. 434 and 1036.

LEON ZITVER, Primary Examiner

R. H. LILES, Assistant Examiner